United States Patent [19]

Doughty

[11] Patent Number: 4,988,876
[45] Date of Patent: Jan. 29, 1991

[54] PERSONNEL RADIATION DOSIMETRY DEVICE AND TESTING UNIT

[75] Inventor: Kevin Doughty, Caernafon Gwynedd, United Kingdom

[73] Assignee: Radon Testing Corporation of America, Elmsford, N.Y.

[21] Appl. No.: 357,706

[22] Filed: May 25, 1989

[51] Int. Cl.⁵ .................................................. G01T 1/14
[52] U.S. Cl. ................................. 250/336.1; 250/253; 250/376
[58] Field of Search ....................... 250/376, 253, 336.1

[56] References Cited

U.S. PATENT DOCUMENTS 4,227,086 10/1980 Dreyfus et al. ..................... 250/389
4,355,235 10/1982 Lewiner et al. .................... 250/376
4,451,736 5/1984 Cameron ............................. 250/376

FOREIGN PATENT DOCUMENTS 0034074 8/1981 European Pat. Off. ............ 250/376

OTHER PUBLICATIONS

P. Kotrappa, J. C. Dempsey, J. R. Hickey and L. R. Stieff, "An Electret Passive Environmental ²²²Rn Monitor Based on Ionization Measurement," *Health Physics*, vol. 54, No. 1 (Jan. 1988), pp. 47-56; ©1988, Health Physics Society.
G. Pretzsch, B. Dörschel and A. Leuschner, "Investigation of Teflon Electret Detectors for Gamma Dosimetry," *Radiation Protection Dosimetry*, vol. 4, No. 2, (1983), pp. 79-84.
M. Ikeya and T. Miki, "Electret Dosimeter Utilizing Gas Multiplication," *Health Physics*, vol. 39, No. 11 (Nov. 1980), pp. 797-799.
H. Bauser and W. Ronge, "The Electret Ionization Chamber: A Dosimeter for Long-Term Personnel Monitoring," *Health Physics*, vol. 34, No. 1 (Jan. 1978), pp. 97-102.

*Primary Examiner*—Constantine Hannaher
*Attorney, Agent, or Firm*—Darby & Darby

[57] ABSTRACT

A system for measuring the cumulative amount of radiation received by a person includes a radiation monitoring electret. This electret is supported on a first conductive plate and preferably is positioned within a protective cavity such that it is not discharged by non-radiation sources. Measurement of the charge decrease on the electret over time is achieved by a null method. In particular, a second plate in the monitoring device located over the electret, or the electret itself, is vibrated and an A.C. amplitude modulation detector produces an output signal created by the alternating electric field due to the vibration. A D.C. voltage of opposite charge is then applied to the first conducting plate on which the electret is supported. This field is increased until it cancels the A.C. field above the electret. When this null occurs, the applied D.C. voltage is equal to the charge on the electret. Using this null technique the electret charge can be accurately measured without contacting the electret.

26 Claims, 1 Drawing Sheet

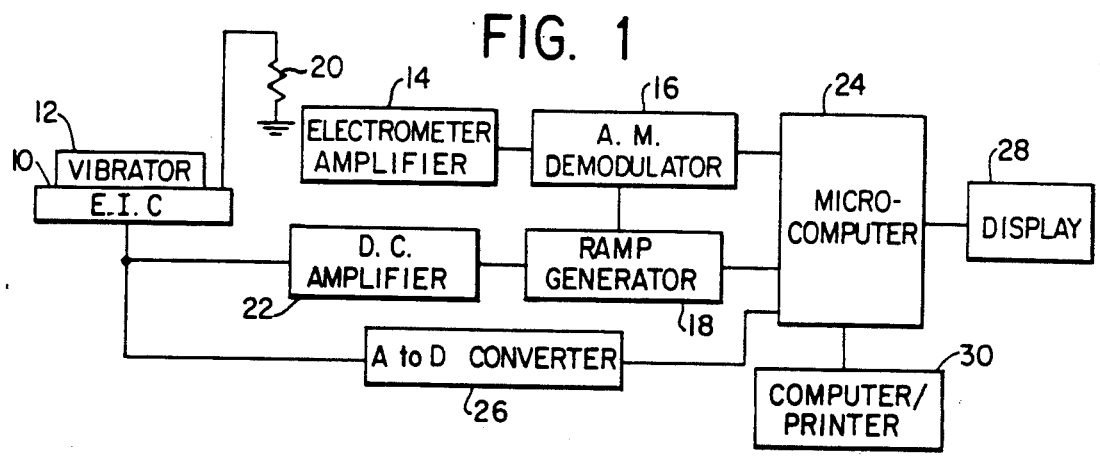
FIG. 1
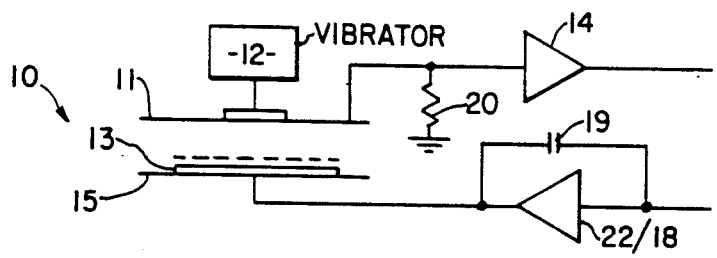
FIG. 2
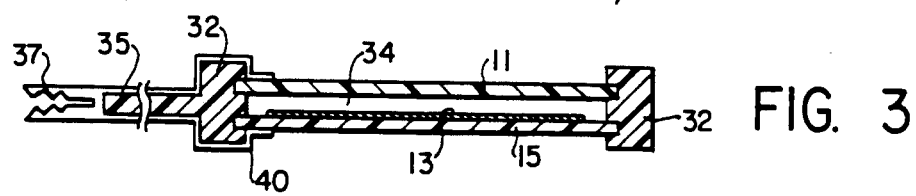
FIG. 3
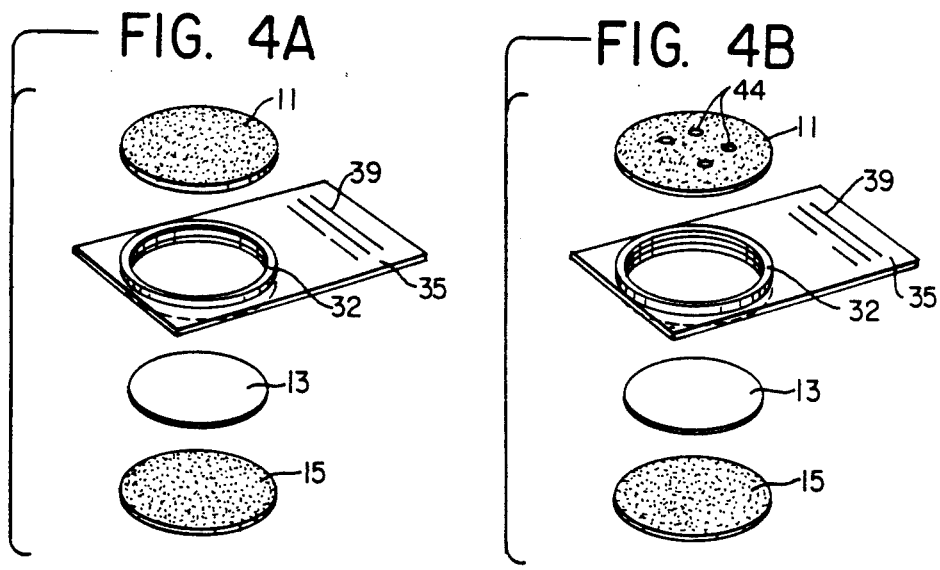
FIG. 4A
FIG. 4B

PERSONNEL RADIATION DOSIMETRY DEVICE AND TESTING UNIT

BACKGROUND OF THE INVENTION

This invention relates to the measurement of radiation and, more particularly, to means for determining the amount of radiation received by personnel.

It is a requirement that personnel who may be exposed to harmful radiation be provided with some means for determining the amount of radiation they may have been exposed to. These personnel include those working in the health care field (where exposure to diagnostic x-rays is a hazard) as well as those handling nuclear or radioactive materials. A fairly rigid system exists for monitoring the radiation exposure of such personnel. Typically this procedure involves the issuance of dosimeter badges which measure the amount of radiation to a person has been exposed over a period of time. These badges are periodically checked to make sure that the person wearing the badge has not received more radiation than is medically safe.

However, the rigid process set up for full time employees is not readily applicable to temporary employees and visitors. This is particularly true for visitors and patients to health care facilities, as well as visitors and contractor-employees visiting nuclear facilities. The same is true of research laboratories that utilize radioactive materials. Here, the difficulty arises with respect to visiting staff.

With the detection technique utilized with the permanent staff of a facility, the dosimeter badges are issued on a periodic basis and then collected. The amount of radiation is then measured by rather sophisticated equipment, e.g. expensive, battery powered, hand-held readers. Since the temporary personnel will only be at the facility for a short time, there is a need for means to measure the amount of radioactive dose quickly and without undue complication, so that it may be performed by ordinary personnel who have not been particularly trained in this area.

The major drawbacks of film and thermoluminescent detector ("TLD") badge systems are (1) nonlinear low energy response, (2) the loss of information upon reading and (3) the requirement for a measuring system that is too formal for nonregistered workers and visitors.

In recent years there has been an increased use of electret ionization chambers to detect radiation. These chambers employ an electret, which is a material that may receive and hold an electrical charge. It maintains this charge over a relatively long period of time without reduction, except in the presence of radiation. When it is exposed to radiation, the radiation causes a reduction in the charge which is directly related to the amount of radiation the electret is exposed to. An explanation of the theory of charge reduction in electret ionization chambers due to x-rays and gamma-rays is set forth in an article by Pretzch et al., Vol. 4, p. 79, *Radiation Potential Dosimeter* (1983). Many designs of electret ionization chambers have been proposed for personnel radiation dosimetry. Examples are contained in the articles by Bauser et al., *Health Physics*, Vol. 34, p. 97 (1978); Cameron et al., *Proceedings on the Sixth Conference on Dosimetry* (1980) and Ikeya et al., *Health Physics*, Vol. 39, p. 797 (1980). However, these devices have not yet gained the confidence of end users because they generally lack a sufficiently accurate electronic measuring system to read and record the cumulative amount of radiation dose.

Electret ionization chamber devices do not suffer from the same problems as film and TLD badges. However, it is difficult to use conventional, easy to operate equipment to measure charge reduction in electret ionization chambers without destroying the charge.

The standard methods of measuring the surface potential of electrets require access to the film surface. These are generally unsatisfactory since they do not allow repeated measurement. Further, there are sonic methods of measuring electret charge as set forth in the above described article by Ikeya et al. These sonic methods have inaccuracies associated with dimensional variations and the effects of the environment. According to the sonic method the electret charge is measured by detecting mechanical oscillation. The mechanical oscillation of the electret creates an A.C. signal whose magnitude is proportional to the charge and the amplitude of the mechanical motion. Thus, the A.C. response is an indication of the electret charge. However, it is sometimes difficult to measure the true amplitude of the A.C. signal, and to calculate the effect of changes in mechanical oscillation.

Therefore, it would be advantageous if a personnel radiation dosimeter could be developed which would provide not only accurate readings of the accumulated dose, but which could also be read with a rather simple device.

SUMMARY OF THE INVENTION

The present invention is directed to a personnel dosimeter and a device for measuring the amount of charge reduction corresponding to the received dose. The present invention accomplishes these objects by means of a special electret dosimeter badge and an improved measuring technique.

In an illustrative embodiment of the invention the dosimeter badge is in the form of an electret which is contained completely within a plastic housing. The top and bottom surfaces of the housing are made of conductive plastic and are separated from each other by an insulating plastic spacer which surrounds the electret. As a result the electret is totally within the housing and thus cannot be touched or contacted by dust, which would tend to reduce its charge. A portion of the insulating spacer can extend in one direction in order to form the means for attaching the badge to a person. This extension can also provide space for an identification code, either printed or in bar code format or both.

The unique dosimeter badge of the present invention has its electret charged to a particular potential, for example, between 100 and 200 volts. It is then worn by personnel in radioactive areas. X-rays or gamma-rays will tend to reduce the charge on the electret contained within the badge. Whenever desired, the amount of this reduction in charge (which is related to the cumulative amount of radiation) can be measured.

Measurement is achieved by placing the badge on a vibrator which moves its top plate up and down at about 180 Hz. The field of the electret creates an A.C. voltage on this top plate. A D.C. voltage of opposite sign is applied to the bottom plate of the badge housing. This other D.C. voltage creates another A.C. signal at the top plate. The D.C. voltage is increased in level until it acts to cancel or null the electrical field created by the charge of the electret.

Because of the use of this null technique, there is no reduction in the charge on the electret and the electret is not contacted. However, an accurate measurement of the amount of charge is achieved because the voltage created by that charge is equal to the amount of voltage required to null it, regardless of the amplitude of the vibration or the separation between the electret and the top plate.

BRIEF DESCRIPTION OF THE DRAWINGS

The foregoing and other features of the present invention will be more readily apparent from the following detailed description and drawings of an illustrative embodiment of the invention in which:

FIG. 1 is a block diagram of the electronic charge measurement system according to the present invention;

FIG. 2 is a simplified drawing of the charge measurement circuit;

FIG. 3 is a cross-sectional view of an isolation chamber according to the present invention which contains an electret; and FIG. 4a is an exploded view of the electret ionization chamber shown in FIG. 3.

FIG. 4b is a view similar to FIG. 4a of an alternative embodiment of the electret ionization chamber in accordance with the invention.

DESCRIPTION OF AN ILLUSTRATIVE EMBODIMENT

The electret dosimeter badge of the present invention has been designed in such a manner as to allow its charge level to be measured by apparatus according to the present invention. The charge measurement apparatus is shown in FIG. 1. This badge has been developed to satisfy the protection needs of non-registered radiation workers in hospitals, nuclear installations and laboratories handling radioactive material. The badge contains a charged electret film that is read by a microprocessor controlled reader unit which calculates the cumulative radiation dose by measuring the surface potential of the electret non-invasively. Thus the badge can be read frequently without destroying the cumulative information on dose.

The badges according to the present invention can be read by a member of the public using a reader according to the present invention. The reader contains all the necessary electronics to recognize a badge and to read or record its dose. The badge is read unopened and without handling the electret film, thus preventing accidental reduction of a portion of its charge. Further, the badge itself contains no electronic circuitry.

According to the present invention, the electronic charge measurement device utilizes a null method in which a D.C. voltage is applied to a first conductive plate supporting the electret while a second conductive plate over the electret is vibrated until the A.C. effect of the vibration of the plate over the charged electret disappears. This technique is independent of errors associated with the output level of the vibration oscillator and other environmental factors, as in the sonic measurement and field cancellation schemes. It is also independent of the separation between the electret and the second conductive plate.

FIG. 1 is a block diagram of the null detection method. As illustrated in FIGS. 1 and 2, mechanical oscillation of the top plate 11 of the badge 10 is performed by a miniature solenoid 12 which is operated at, for example, 180 Hz. However, the frequency could be lower, e.g., 60 Hz, or higher, so long as a good quality A.C. signal is produced. This vibration produces an A.C. signal across a load resistor 20 at the input to electrometer amplifier 14 which is related to the amount of the charge on electret 13. The size of this A.C. signal is detected by amplitude modulation demodulator 16. This demodulator in turn controls a ramp generator which may be formed from an operational amplifier connected as an integrator with a capacitor 19 in its feedback loop. This ramp generator 18 in turn drives a high voltage amplifier 22 which forces charge onto the bottom plate 15 of the badge. The effect of the charge applied to the bottom plate 15 of the badge is to lower the effective field in the electret ionization chamber. This produces a reduced A.C. signal. Ultimately, if equal and opposite charge exists on the surface of the electret 13 and on the bottom plate 15 of the electret ionization chamber, there will be zero electric field in the air gap 34 (FIG. 3) in the electret ionization chamber. Therefore, there will be no A.C. signal generated in response to the vibration of the top plate. This is the null point and it can be used to calculate the surface potential on the electret in a straightforward manner. If further charge is forced onto the bottom plate 15 of the badge, an A.C. signal of opposite phase will be detected in the electrometer amplifier 14.

The output of amplitude modulation detector 16 is coupled to a microcomputer 24. This microcomputer is coupled to ramp generator 18 and determines when this generator operates to measure the charge of the badge. The D.C. signal applied to the bottom of the badge is converted into a digital code by analog-to-digital converter 26. This code in turn is applied to the microcomputer. Thus, when the microcomputer detects a zero input from amplitude demodulator 16, it stores the digital code from converter 26. This code represents the null voltage on the bottom of the badge, which is equivalent to the charge on the electret within the badge. This data on the amount of the charge in the badge can be displayed on any convenient display 28 and/or the results can be printed on a computer printer 30. A computer spread sheet can be developed by microcomputer 24 to incorporate the standard relationships for the reduction of charge in an electret as a function of the dose of radiation.

The design of the badge is shown in FIGS. 3 and 4. With this design the electret is housed in a chamber such that it is positioned between two conducting plates 11, 15 which are insulated from each other. This housing is also arranged so that one of the plates 11 can be vibrated using only a small force. Preferably the materials used for the badge match body tissue as closely as possible, while being resistant to attack from chemicals and from the environment.

As shown in FIG. 3 the top 11 and bottom 15 of the chamber are each manufactured from conductive plastics materials and are separated by a gasket of insulating plastics materials 32, for example P.V.C., which provides both the necessary insulation between the plates and acts as a spacer to create a specified air gap 34 within the electret ionization chamber.

The insulating spacer is extended as shown by a portion 35. This allows the badge to be attached to the user by an attachment device 37 and also provides a portion 39 on which identification information can be printed. This identification information can be, for example, a bar code or handprinted information. Attachment clip 37 is made of a conductive material and has legs 40 that extend to and electrically connect plates 11, 15 to activate the badge for use. Clip 37 is removed during measurement. Without clip 37 the badge is no longer effective to measure radiation.

The electret material can be any convenient type but is preferably fluoroethylenepropylene/tetrafluoroethylene ("FEP/TFE") because of its excellent charge retention properties.

For a given range of dose it is possible to calculate a whole family of dimensions which satisfy the present invention. However, for ease of wearing, the badge should be small. For example, less than 5 mm thick. Also a preferred range of useful electret field is between 10,000 and 40,000 volts per meter. Thus, for an electret initially charged to 100 volts a device is created with a dose range of 128 mSv using electrets of 1.6 mm thickness and an air gap of 2.5 mm. This range of dose may be adjusted by changing the dimensions to suit the desired requirements.

The dose sensitivity is dependent on the resolution with which the surface potential can be measured. In general, levels of sensitivity down to 0.001 mSv may be required and this involves measuring voltage over six orders of magnitude to achieve the desired range.

An experiment was conducted with the present testing equipment with a series of electrets which were supplied with different surface potentials in the range of 20 to 200 volts. The present invention was able to read the voltage repeatably (three successive occasions) to four significant figures in each case. Furthermore, measurements of surface voltage were in agreement with other conventional methods, thus proving that the measurement procedure does not affect the charge. These tests indicate that it is possible to produce a system with a sensitivity of better than 0.01 mSv and with a range of 100 mSv using a single type of electret and badge. The range may be extended in both ways by employing two badges or by incorporating two electrets of different thickness and/or surface charge in the electret ionization chamber.

With the prevent invention a novel system is created for the measurement of surface potential on an electret film inside a sealed badge designed as an electret ionization chamber. This system may be employed in certain circumstances for personnel radiation dosimetry. By using a null method the charge in the badge, which has been reduced due to radiation exposure, can be measured by personnel who have not been especially trained.

While the invention has been particularly shown and described with reference to a preferred embodiment thereof, it will be understood by those skilled in the art that various changes in form and details may be made therein without departing from the spirit and scope of the invention. For example, by putting holes 44 in plate 11, as illustrated in FIG. 4b the badge may be used to detect Radon gas.

We claim:

1. A system for measuring the cumulative amount of radiation received, comprising
a radiation monitoring means, including an electret supported on a first conductive plate and having a second conductive plate spaced from the electret on the side opposite the first plate, the electret being chargeable to a certain potential and the potential being discharged in relation to the cumulative amount of radiation received by the electret;
vibrator means for creating a mechanical vibration between the second plate and the electret at a certain rate;
detector means for indicating the alternating electrical field created by the vibration of the second plate;
means for applying to the first conductive plate a D.C. voltage of the opposite polarity to the charge on the electret; and
means for increasing the D.C. voltage in a controlled manner until the detector means indicates that the alternating electrical field has been substantially cancelled, whereby the difference between the certain potential of the electret and the D.C. voltage when the field is substantially cancelled is related to the cumulative amount of radiation received.

2. A system as claimed in claim 1 wherein the certain rate of vibration is about 180 Hz.

3. A system as claimed in claim 1 wherein the electret is made of FEP/TFE.

4. A system as claimed in claim 1 wherein the radiation monitoring means further includes an insulating spacer means connecting said first and second conductive plates together so as to form a closed cavity about the electret.

5. A system as claimed in claim 4 wherein the insulating spacer has an extension which supports an attachment means for attaching the radiation monitoring means to a person.

6. A system as claimed in claim 5 wherein the extension is large enough to accept legible identifying information.

7. A system as claimed in claim 4 wherein the first and second conductive plates are made of a conductive plastics material and the insulating spacer means is made of an insulating plastics material.

8. A system as claimed in claim 1 wherein the detector means is an A.C. amplitude modulation detector circuit.

9. A system as claimed in claim 1 wherein the means for applying a D.C. voltage is a D.C. amplifier and the means for increasing the D.C. voltage is a ramp generator connected to the input of the D.C. amplifier.

10. A system as claimed in claim 1 further including a converter means for converting the output voltage of the means for applying a D.C. voltage, into a digital code, and
a microprocessor means for receiving the digital code from the converting means and storing the code when the electrical field is substantially cancelled, said microprocessor means controlling the means for increasing the D.C. voltage such that it starts at the beginning of a measurement and ends when the electrical field is substantially cancelled.

11. An electret charge measuring device comprising:
a vibrator means for creating a mechanical vibration at a certain rate between the electret and a conducting plate positioned from an electret;
detecting means for indicating the alternating electrical field created by the vibration;
means for applying a D.C. voltage of the opposite polarity as the charge on the electret to a second plate located on the opposite side of the electret; and
means for increasing the D.C. voltage in a controlled manner until the detector means indicates that the alternating electrical field has been substantially cancelled.

12. An electret charge measuring device as claimed in claim 11 further including means for measuring the D.C. voltage at the point when the field is substantially cancelled and means for displaying this value.

13. An electret charge measuring device as claimed in claim 12 further including means for converting the voltage value into a difference signal equal to the difference between the initial charge on the electret and the charge indicated by the measured voltage, and relating this difference signal to the cumulative radiation received by the electret.

14. A system as claimed in claim 11 wherein the rate of vibration is above 60 Hz.

15. An electret charge measuring device as claimed in claim 11 wherein the detector means is an A.C. amplitude modulation detector circuit.

16. An electret charge measuring device as claimed in claim 11 wherein the means for applying a D.C. voltage is a D.C. amplifier and the means for increasing the D.C. voltage is a ramp generator connected to the input of the D.C. amplifier.

17. An electret charge measuring device as claimed in claim 11 further including a converter means for converting the output of the means for applying a D.C. voltage into a digital code, and a microprocessor means for receiving the digital code from the converting means and storing the code when the field is substantially cancelled, said microprocessor means controlling the means for increasing the D.C. voltage such that it starts at the beginning of a measurement and ends when the field is substantially cancelled.

18. A personnel dosimeter comprising:

an electret chargeable to a certain potential, the potential being discharged in relation to the cumulative amount of radiation received by the electret;

a first electrically conductive plate supporting the electret on the side which is not to be charged;

a second electrically conductive plate spaced at a distance from the electret on the side opposite the first conductive plate; and an electrically insulating spacer means connecting said first and second plates together so as to form a closed cavity about the electret, the connection between said spacer means and at least one said plate allowing vibration of one said plate with respect to the other said plate, said vibration acting to alternately increase and decrease said distance between said plates.

19. A personnel dosimeter as claimed in claim 18 wherein the insulating spacer further includes an extension which supports and attachment means for attaching the dosimeter to a person, which extension is large enough to accept legible identifying information.

20. A personnel dosimeter as claimed in claim 18 wherein the first and second conductive plates are made of a conductive plastics material and the insulating spacer means is made of an insulating plastics materials.

21. A personnel dosimeter as claimed in claim 18 wherein the second plate is perforated such that Radon gas may be detected.

22. A personnel dosimeter as claimed in claim 18 further including an attachment means for attaching the dosimeter to a person, said attachment means providing electrical connection between the first and second plates to activate the dosimeter.

23. A personnel dosimeter as claimed in claim 18 further including connection means for electrically connecting the first and second plates to activate the dosimeter such that the charge on the electret is reduced by radiation.

24. A personnel dosimeter as claimed in claim 18, wherein said vibration generates an AC-potential between said first and second plates, when said electret has a charge thereon.

25. A personnel dosimeter as claimed in claim 18, wherein the space between said second plate and said electret is unobstructed.

26. A personnel dosimeter as claimed in claim 18, wherein the area of said electret exposed to said second plate is constant.

* * * * *